(12) United States Patent
Prosser et al.

(10) Patent No.: US 12,296,289 B2
(45) Date of Patent: May 13, 2025

(54) FLOTATION FILTER WITH INTERNAL GRID

(71) Applicants: David D. M. Prosser, Des Moines, IA (US); Gerald J. Budde, Windsor Heights, IA (US)

(72) Inventors: David D. M. Prosser, Des Moines, IA (US); Gerald J. Budde, Windsor Heights, IA (US)

( * ) Notice: Subject to any disclaimer, the term of this patent is extended or adjusted under 35 U.S.C. 154(b) by 99 days.

(21) Appl. No.: 17/496,321

(22) Filed: Oct. 7, 2021

(65) Prior Publication Data

US 2022/0105451 A1 Apr. 7, 2022

Related U.S. Application Data

(60) Provisional application No. 63/088,651, filed on Oct. 7, 2020.

(51) Int. Cl.
*B01D 35/05* (2006.01)
*B01D 29/01* (2006.01)
*B01D 29/13* (2006.01)

(52) U.S. Cl.
CPC .............. *B01D 35/05* (2013.01); *B01D 29/01* (2013.01); *B01D 29/13* (2013.01); *B01D 2201/0415* (2013.01); *B01D 2201/0423* (2013.01)

(58) Field of Classification Search
CPC .... B01D 35/05; B01D 29/0036; B01D 29/01; B01D 2201/0415; B01D 2201/0423
USPC ....................................... 210/242.1
See application file for complete search history.

(56) References Cited

U.S. PATENT DOCUMENTS

2017/0028326 A1* 2/2017 Till ....................... B01D 35/306
2021/0236967 A1* 8/2021 Shotey ............... B01D 33/0108

* cited by examiner

*Primary Examiner* — Hayden Brewster
(74) *Attorney, Agent, or Firm* — ZarleyConley PLC

(57) ABSTRACT

A flotation filter has an outer member that has a top section and bottom section that are hollow. The top section has an inner edge and an outer edge with the outer edge having a diameter that is adapted to slide up and down an inner diameter of a storage container. Connected to the inner edge of the outer member is an internal grid. The internal grid includes members that crisscross to provide spaced openings. Further, the internal grid dwells in a plane below a horizontal plane of a top surface of the top section.

17 Claims, 3 Drawing Sheets

FLOTATION FILTER WITH INTERNAL GRID

CROSS REFERENCE TO RELATED APPLICATION

This application claims the benefit of U.S. Provisional Application Ser. No. 63/088,651 filed Oct. 7, 2020, the contents of this application is hereby incorporated by reference in its entirety.

BACKGROUND OF THE INVENTION

This invention is directed to a flotation filter and more particularly a flotation filter for use with paint and cleaning devices.

Typically, when painting the interior or exterior of a home, one either pours the paint from a storage container (i.e., bucket or paint can) to a paint tray, or dips a painting utensil directly into the storage container. While useful, often paint will collect on the end of a roller and/or the handle and excessive paint can collect upon the nap of the roller. In addition, to strain the paint, a paint strainer is used, such as a bag or cone, which is a messy process.

To solve these problems, a device is needed that is easy to use, limits contents from collecting on an outer edge of the roller, and can also be used to strain the contents. Accordingly, a need exists in the art for a device that addresses these deficiencies.

Accordingly, an objective of the present invention is to provide a flotation filter that limits content from collecting on an outer edge of a roller.

Another objective of the present invention is to provide a flotation filter that is used to strain the content of a storage container.

These and other objectives will be apparent to those having ordinary skill in the art based upon the following written description, drawings, and claims.

SUMMARY OF THE INVENTION

Figure 1:
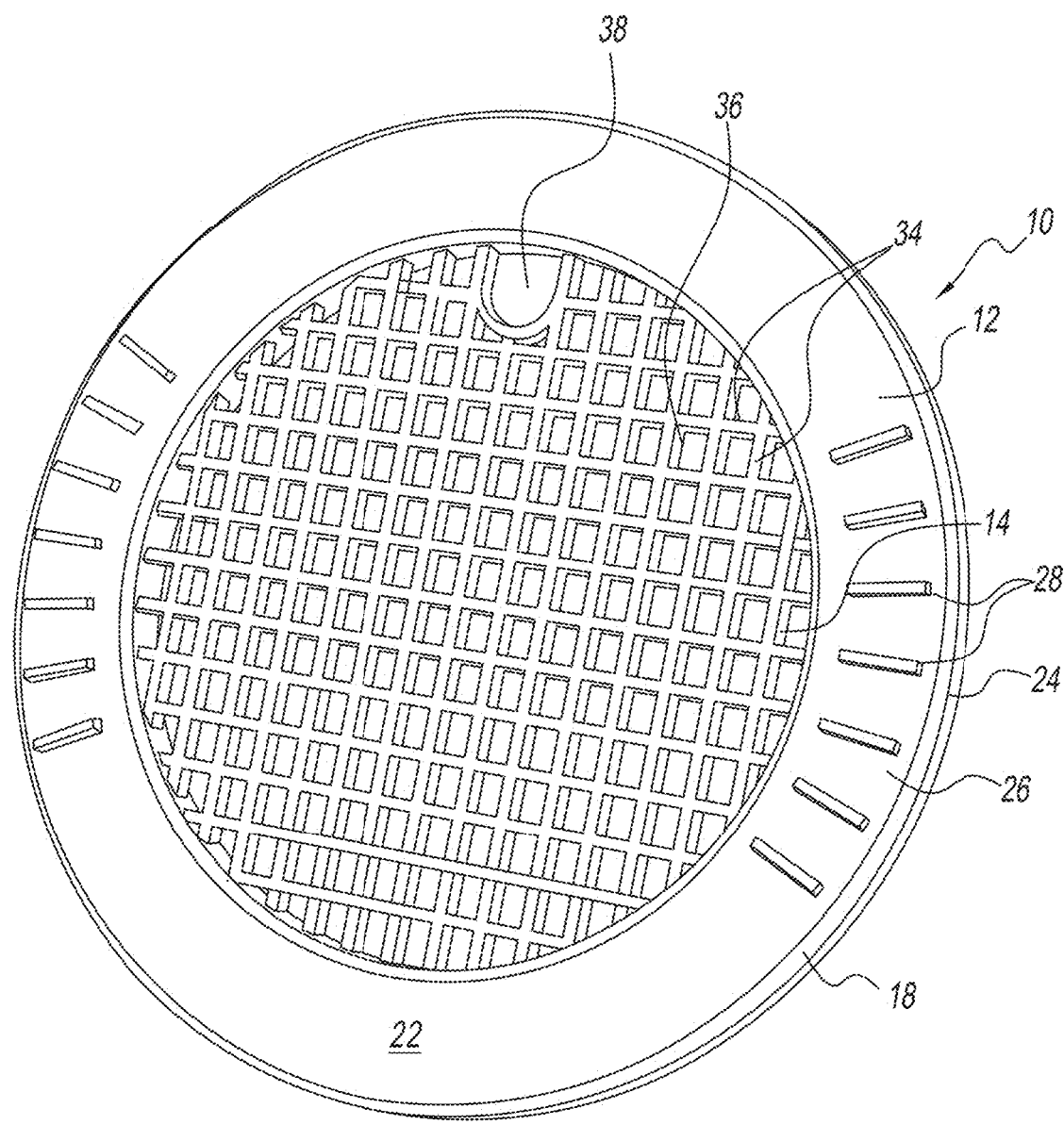
FIG. 1 is a top plan view of a flotation filter.
Figure 2:
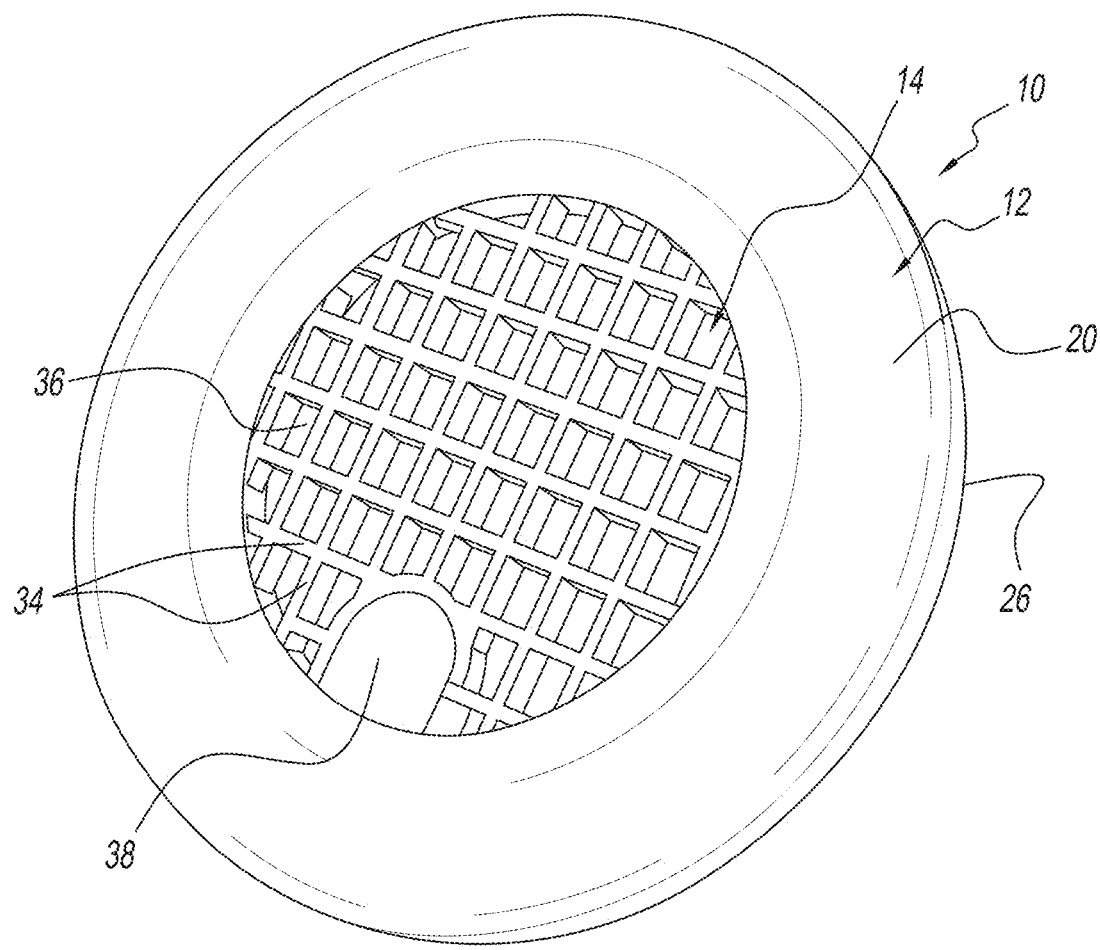
FIG. 2 is a perspective view of a flotation filter.
Figures 3, 4:
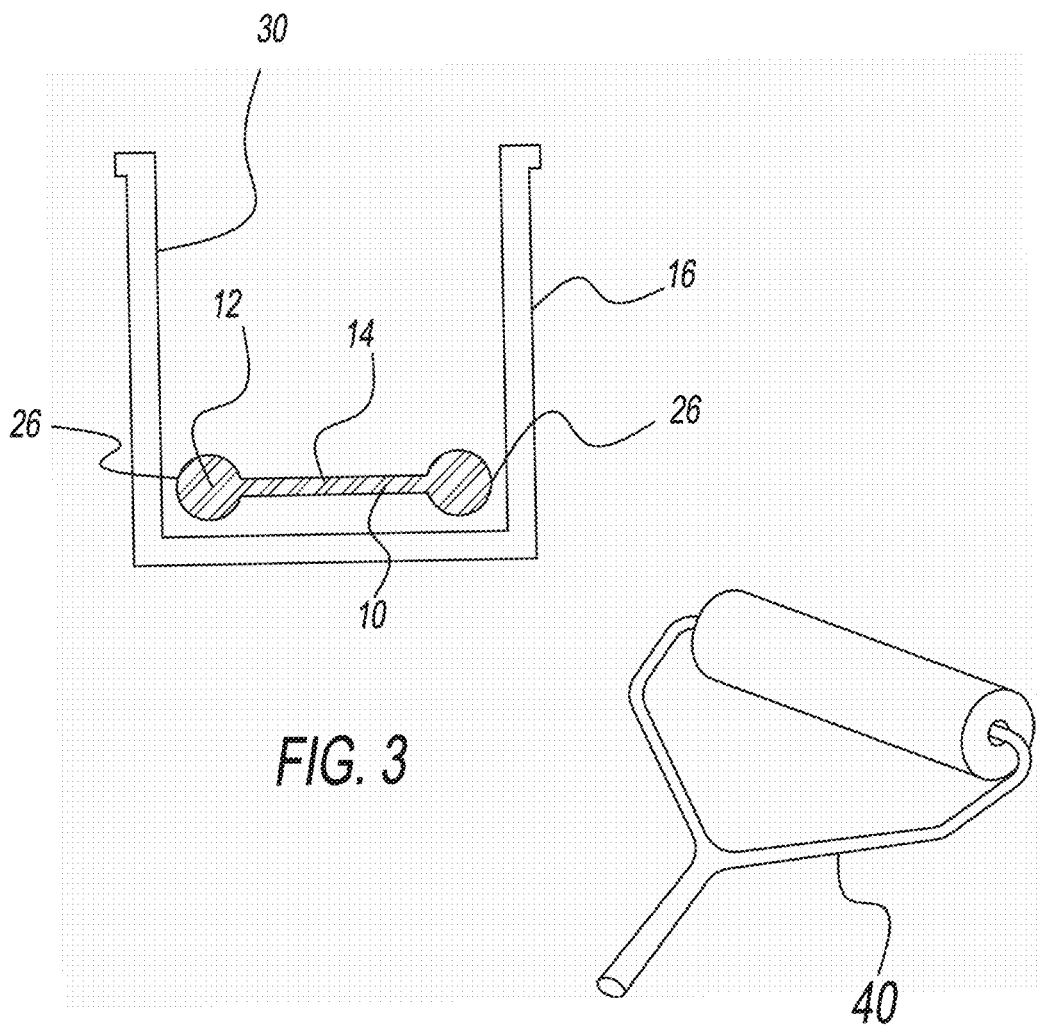
FIG. 3 is a side sectional view of a flotation filter inside a storage container.
FIG. 4 is a perspective view of a paint roller.

A flotation filter includes an outer member having a top section and a bottom section that are hollow. The top section has an inner edge and an outer edge, with the outer edge having a diameter adapted to slide up and down an inner diameter of a storage container. Connected to the inner edge of the outer member is an internal grid. In one example the top section is flat and the bottom section is arcuate. The top surface also has projections.

The internal grid includes members that crisscross to provide space openings. The grid also has a large grip opening adjacent the inner edge. Preferably the grid dwells in a horizontal plane below a horizontal plane of a top surface of the top section. The inner edge of the top section is angled inwardly from a top surface toward the grid. While the grid is removably attached to the outer member, alternatively it is integral to the outer member.

DETAILED DESCRIPTION

Referring to the Figures, a flotation filter 10 includes an outer member 12 with an internal grid 14. The filter is described for use with a painting application, but can be used for other applications such as cleaning systems and the like without departing from the scope of the invention. The outer member 12 is of any size, shape and structure. In particular, the outer member 12 is adapted to slideably fit within a container 16 such as a paint bucket or can. In one example, the outer member 12 has a circular shape to fit within a circular bucket 16.

The outer member 12 has a first or top section 18 and a second or bottom section 20 that is preferably hollow. The first section 18 has a top surface 22 that is generally flat or horizontal, an inner edge 24, and an outer edge 26. The width of the top surface, in one example, is one inch, but can be of any size. Extending upwardly and generally perpendicularly away from the top surface 22 are a plurality of spaced projections 28. The projections 28 are of any size, shape and structure and in one example have a height of 0.5 millimeters. The outer edge 26 has a diameter less than an inner diameter of the storage container 16, and preferably leaves little if any space between the outer edge 26 and inner surface 30 of the container while still permitting the filter to slide up and down within container 16. As an example, the outer edge 26 has a ten inch diameter when used with a five gallon bucket, and a 5.5 inch diameter when used with a one gallon can.

The second section 20 is of any shape and size. In one example, the section 20 is arcuate, like a partial tube, but can also be triangular, square, angled, flat or any geometric shape that accommodates the shape of the container 16. The section 20 also has a size and structure sufficient to permit the filter 10 to float within the container 16 based upon the density of the product contained within the container 16.

Connected to the inner edge 24 of the first section 18 or an inner portion of the second section 20 is the inner grid 14. The grid 14 is made up of a plurality of members 34 that crisscross in any manner to provide spaced openings 36. The depth of the members 34 and the size and shape of the openings 36 is of any dimension and type. In one example, the depth of the members is 0.25 inches and the width of the openings 36, which are square in shape, are approximately 0.5 inches. Preferably, the grid 14 dwells in a horizontal plane below a horizontal plane of the top surface 22 of the first section 18, and the inner edge 24 of the first section is angled inwardly from the top surface 22 toward the grid 14. Also, the grid 14 has a larger grip opening 38 adjacent the inner edge 24 and adapted to receive a person's thumb or finger.

The grid 14 is either integral to the outer member 12, or is removably attached in any conventional manner such as a friction fit, snap fit, or any other manner of attaching the grid to the outer member. Preferably, the grid 14 dwells in a plane 0.25 inches below the top surface of the top section, but can be adjusted to a different plane depending upon the roller nap size, the application, and the density of the container contents.

In operation, to strain the contents of the container 16, the filter 10 is placed in the bottom of an empty container 16. The content is then poured into the container 16 and flows through the openings 36 in the grid 14. As the content flows through the grid 14, it pushes the filter 10, which floats on top of the contents, upwardly with the outer edge 26 sliding along the inner surface 30 of the container 16. Portions (i.e., chunks) larger than the openings 36 remain on top of the grid 14 and once all content has been added to the container 16, the filter 10, along with the chunks, is removed and cleaned with the chunks being discarded.

For use with painting, the filter 10 is placed in the container 16 where it floats on top of the contents. Using a brush 40, such as a roller, the roller 40 is pressed downwardly against the top surface 22 of the top section 18 causing the filter 10 to sink within the contents, and paint to flow through the openings 36 in the grid 14. The roller 40 is rolled back and forth to capture the paint on the nap of the roller 40. The projections 28 prevent the roller from sliding on the top surface 22, while the top surface provides an area where either paint is prevented from being applied to the roller at the ends, or permits paint to be removed from the nap of the roller 40 and onto the top surface. Once paint is applied to the roller 40, the paint is transferred to a desired surface and the process is repeated.

From the above discussion and accompanying figures and claims it will be appreciated that the flotation filter 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A flotation filter, comprising:
   an outer member having a top section and a bottom section that are hollow;
   the top section having an inner edge and an outer edge;
   the top section having a top surface;
   the top surface having a plurality of projections;
   the outer edge has a diameter adapted to slide up and down an inner diameter of a storage container; and
   an internal grid connected to the inner edge of the outer member.

2. The flotation filter of claim 1 wherein the top section is flat.

3. The flotation filter of claim 1 wherein the bottom section is arcuate.

4. The flotation filter of claim 1 wherein the outer member is circular.

5. The flotation filter of claim 1 wherein the internal grid includes members that crisscross to provide spaced openings.

6. The flotation filter of claim 5 wherein the internal grid is positioned in a horizontal plane below the top surface of the top section.

7. The flotation filter of claim 1 wherein the inner edge of the top section is angled inwardly from the top surface toward the internal grid.

8. The flotation filter of claim 1 further comprising the internal grid having a grip opening adjacent the inner edge; wherein the grip opening is larger than a plurality of spaced openings of the internal grid.

9. The flotation filter of claim 1 wherein the internal grid is integral to the outer member.

10. The flotation filter of claim 1 wherein the internal grid is removably attached to the outer member.

11. The flotation filter of claim 1 wherein the plurality of projections extend upwardly and generally perpendicularly from the top surface.

12. The flotation filter of claim 8 wherein the grip opening is configured to receive a finger.

13. A flotation filter, comprising:
    an outer member having a top section and a bottom section that are hollow;
    the top section having an inner edge and an outer edge;
    the outer edge has a diameter adapted to slide up and down an inner diameter of a storage container;
    an internal grid connected to the inner edge of the outer member; and
    the internal grid having a grip opening adjacent the inner edge;
    wherein the grip opening is larger than a plurality of spaced openings of the internal grid.

14. The flotation filter of claim 13 wherein the grip opening is configured to receive a finger.

15. A flotation filter, comprising:
    an outer member having a top surface and an inner edge, wherein the outer member has a circular shape;
    a plurality of projections extending upwardly from the top surface of the outer member;
    an internal grid connected to and across the outer member in a horizontal plane positioned below the top surface; and
    the internal grid having a plurality of openings and a grip opening, wherein the grip opening is larger than the plurality of openings.

16. The flotation filter of claim 15 wherein the grip opening abuts the inner edge of the outer member.

17. The flotation filter of claim 16 further comprising the outer member having a first section and a second section, wherein the second section is arcuate and the top surface of the outer member is flat.

* * * * *